US009329938B2

(12) United States Patent
Chambliss et al.

(10) Patent No.: US 9,329,938 B2
(45) Date of Patent: May 3, 2016

(54) ESSENTIAL METADATA REPLICATION (71) Applicant: INTERNATIONAL BUSINESS MACHINES CORPORATION, Armonk, NY (US)

(72) Inventors: David D. Chambliss, Morgan Hill, CA (US); Ehood Garmiza, Neve Ziv (IL); Leah Shalev, Zichron-Yaakov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 432 days.

(21) Appl. No.: 13/863,543

(22) Filed: Apr. 16, 2013

(65) Prior Publication Data

US 2014/0310244 A1 Oct. 16, 2014

(51) Int. Cl.
| G06F 7/00 | (2006.01) |
| G06F 17/30 | (2006.01) |
| G06F 17/00 | (2006.01) |
| G06F 11/14 | (2006.01) |
| G06F 11/20 | (2006.01) |

(52) U.S. Cl.
CPC ........ G06F 11/1435 (2013.01); G06F 11/2094 (2013.01)

(58) Field of Classification Search
CPC ............ G06F 17/3007; G06F 11/1435; G06F 11/2094; G06F 17/30
See application file for complete search history.

(56) References Cited

U.S. PATENT DOCUMENTS

| 5,636,359 A | 6/1997 | Beardsley et al. |
| 5,724,501 A | 3/1998 | Dewey et al. |
| 5,784,548 A | 7/1998 | Liong et al. |
| 5,809,320 A | 9/1998 | Jain et al. |
| 5,933,860 A | 8/1999 | Emer et al. |
| 5,960,169 A | 9/1999 | Styczinski |
| 6,012,123 A | 1/2000 | Pecone et al. |
| 6,038,641 A | 3/2000 | Zangenehpour |

(Continued)

FOREIGN PATENT DOCUMENTS

| CN | 1664793 A | 9/2005 |
| CN | 101997918 A | 3/2011 |

(Continued)

OTHER PUBLICATIONS

Sivathanu, et al., Improving Storage System Availability with D-GRAID, ACM Transactions on Storage, vol. 1, No. 2, May 2005. http://pages.cs.wisc.edu/~muthian/dgraid-tos.pdf.

(Continued)

*Primary Examiner* — Azam Cheema
(74) *Attorney, Agent, or Firm* — Griffiths & Seaton PLLC (57) ABSTRACT

Methods, apparatus and computer program products implement embodiments of the present invention that include defining, in a storage system including receiving, by a storage system, a storage request, and identifying, based on the storage request, one or more storage management units. For each of the storage management units, a master partition table having multiple master entries and one or more backup partition tables is identified, each of the backup partition tables having backup entries in a one-to-one-correspondence with the master entries. The storage request is performed, and upon the storage request being performed, any changes to essential metadata in the one or more master partition tables are identified, and the identified changes are stored to the essential metadata in the one or more backup partition tables.

17 Claims, 7 Drawing Sheets

FIG. 1

(56) References Cited

U.S. PATENT DOCUMENTS

| | | | |
|---|---|---|---|
| 6,101,615 A | 8/2000 | Lyons | |
| 6,243,795 B1 | 6/2001 | Yang et al. | |
| 6,505,216 B1 * | 1/2003 | Schutzman | G06F 11/1456 |
| 6,529,995 B1 | 3/2003 | Shepherd | |
| 6,714,789 B1 | 3/2004 | Oh et al. | |
| 6,775,738 B2 | 8/2004 | Ash et al. | |
| 7,593,974 B2 | 9/2009 | Suzuki et al. | |
| 7,657,509 B2 | 2/2010 | Clark et al. | |
| 7,849,356 B2 | 12/2010 | Jones et al. | |
| 7,945,732 B2 | 5/2011 | Koseki | |
| 7,987,158 B2 | 7/2011 | Boyd et al. | |
| 8,103,904 B2 | 1/2012 | Hafner et al. | |
| 8,112,395 B2 | 2/2012 | Patel et al. | |
| 8,156,368 B2 | 4/2012 | Chambliss et al. | |
| 8,494,063 B1 | 7/2013 | Reudink et al. | |
| 9,104,599 B2 | 8/2015 | Atkisson et al. | |
| 9,146,695 B2 | 9/2015 | Galloway et al. | |
| 2002/0091897 A1 | 7/2002 | Chiu et al. | |
| 2002/0170017 A1 | 11/2002 | Busser | |
| 2003/0204690 A1 * | 10/2003 | Yamada | G06F 11/1458 711/162 |
| 2004/0093464 A1 | 5/2004 | Hassner et al. | |
| 2004/0128269 A1 | 7/2004 | Milligan et al. | |
| 2004/0139365 A1 | 7/2004 | Hosoya | |
| 2005/0015436 A1 * | 1/2005 | Singh | G06F 17/30575 709/203 |
| 2005/0055630 A1 | 3/2005 | Scanlan | |
| 2005/0289296 A1 | 12/2005 | Balasubramanian | |
| 2006/0123270 A1 | 6/2006 | Forhan et al. | |
| 2006/0294301 A1 | 12/2006 | Zohar et al. | |
| 2007/0016754 A1 | 1/2007 | Testardi | |
| 2007/0028145 A1 | 2/2007 | Gerhard et al. | |
| 2007/0067667 A1 | 3/2007 | Ikeuchi et al. | |
| 2007/0079083 A1 | 4/2007 | Gladwin et al. | |
| 2008/0040553 A1 | 2/2008 | Ash et al. | |
| 2008/0195807 A1 | 8/2008 | Kubo et al. | |
| 2008/0201608 A1 | 8/2008 | Forhan et al. | |
| 2008/0263274 A1 | 10/2008 | Kishi et al. | |
| 2009/0049050 A1 | 2/2009 | Whitehead | |
| 2009/0089612 A1 | 4/2009 | Mathew et al. | |
| 2009/0216832 A1 | 8/2009 | Quinn et al. | |
| 2010/0199125 A1 | 8/2010 | Reche | |
| 2011/0153606 A1 | 6/2011 | Kim et al. | |
| 2011/0161299 A1 | 6/2011 | Prahlad et al. | |
| 2011/0202792 A1 | 8/2011 | Atzmony | |
| 2011/0208912 A1 | 8/2011 | Chambliss et al. | |
| 2011/0208922 A1 | 8/2011 | Coronado et al. | |
| 2011/0208943 A1 | 8/2011 | Schott | |
| 2011/0225453 A1 | 9/2011 | Spry et al. | |
| 2011/0258391 A1 | 10/2011 | Atkisson et al. | |
| 2011/0282835 A1 | 11/2011 | Cannon et al. | |
| 2012/0110257 A1 | 5/2012 | Enohara et al. | |
| 2012/0210060 A1 | 8/2012 | Acuna et al. | |
| 2013/0024627 A1 | 1/2013 | Benhase et al. | |
| 2014/0019421 A1 * | 1/2014 | Jagadeesan | G06F 7/00 707/687 |
| 2014/0310456 A1 | 10/2014 | Chambliss et al. | |
| 2014/0310457 A1 | 10/2014 | Chambliss et al. | |
| 2014/0310464 A1 | 10/2014 | Chambliss et al. | |
| 2014/0310465 A1 | 10/2014 | Chambliss et al. | |
| 2014/0310489 A1 | 10/2014 | Chambliss et al. | |
| 2014/0310557 A1 | 10/2014 | Chambliss et al. | |
| 2015/0268883 A1 | 9/2015 | Chambliss et al. | |
| 2015/0268884 A1 | 9/2015 | Chambliss et al. | |
| 2015/0269026 A1 | 9/2015 | Chambliss et al. | |

FOREIGN PATENT DOCUMENTS

| | | |
|---|---|---|
| CN | 102185929 A | 9/2011 |
| WO | 2014170791 A3 | 10/2014 |

OTHER PUBLICATIONS

Ripberger et al., "IBM System Storage DS8000 Storage Virtualization Overview," IBM, Apr. 13, 2010.

Rodeh, "B-trees, Shadowing and Clones," ACM Transactions on Computational Logic, vol. V, No. N, IBM, Aug. 2007.

* cited by examiner

ESSENTIAL METADATA REPLICATION

FIELD OF THE INVENTION

The present invention relates generally to data storage, and specifically to replicating essential metadata to one or more backup nodes of a storage system.

BACKGROUND

In computer storage systems (also referred to herein as storage subsystems), disk partitioning and logical volume management are used to manage physical storage devices such as hard disk drives. In disk partitioning, a single storage device is divided into multiple logical storage units referred to as partitions, thereby treating one physical storage device as if it were multiple disks. Logical volume management provides a method of allocating space on mass-storage devices that is more flexible than conventional partitioning schemes. In particular, a volume manager can concatenate, stripe together or otherwise combine regions (a region, also referred to herein as a partition, is a sequence of bytes having a specific length, typically one megabyte) into larger virtual regions that administrators can re-size or move, potentially without interrupting system use.

To manage a given volume, a partition table can be utilized to define the relationship between a logical address of a logical volume and physical regions (also known as blocks and partitions) on the physical storage device. Upon receiving a request to perform an input/output (I/O) operation at a specific logical address on the given volume, a storage system can utilize the partition table identify the physical location on a storage device that corresponds to the specific logical address.

SUMMARY

There is provided, in accordance with an embodiment of the present invention a method, including receiving, by a storage system, a storage request, identifying, based on the storage request, one or more storage management units, identifying, for each of the storage management units, a master partition table having multiple master entries and one or more backup partition tables, each of the backup partition tables having backup entries in a one-to-one-correspondence with the master entries, performing the storage request, upon performing the storage request, identifying any changes to essential metadata in the one or more master partition tables, and storing the identified changes to the essential metadata in the one or more backup partition tables.

There is also provided, in accordance with an embodiment of the present invention a storage system, including a memory configured to store multiple master partition tables and multiple backup partition tables, and a processor configured to receive a storage request, to identify, based on the storage request, one or more storage management units, to identify, for each of the storage management units, one of the master partition tables having multiple master entries and one or more backup partition tables, each of the backup partition tables having backup entries in a one-to-one-correspondence with the master entries, to perform the storage request, to identify, upon performing the storage request, any changes to essential metadata in the one or more master partition tables, and to store the identified changes to the essential metadata in the one or more backup partition tables.

There is further provided, in accordance with an embodiment of the present invention a computer program product, the computer program product including a non-transitory computer readable storage medium having computer readable program code embodied therewith, the computer readable program code including computer readable program code configured to identify, based on the storage request, one or more storage management units, computer readable program code configured to identify, for each of the storage management units, a master partition table having multiple master entries and one or more backup partition tables, each of the backup partition tables having backup entries in a one-to-one-correspondence with the master entries, computer readable program code configured to perform the storage request, computer readable program code configured upon performing the storage request, to identify any changes to essential metadata in the one or more master partition tables, and computer readable program code configured to store the identified changes to the essential metadata in the one or more backup partition tables.

BRIEF DESCRIPTION OF THE DRAWINGS

The disclosure is herein described, by way of example only, with reference to the accompanying drawings, wherein.

DETAILED DESCRIPTION OF EMBODIMENTS

In operation, a storage system may store a given set of data in a storage management unit (SMU). Examples of storage management units include but are not limited to logical volumes, storage pools and slices. In the embodiments described herein, a slice comprises a set of partitions on a given storage device, and a logical volume may comprise multiple slices distributed among multiple storage devices.

Embodiments of the present invention provide methods and systems for managing essential and non-essential metadata for each SMU in the storage system. As explained hereinbelow, the essential metadata comprises a minimum set of metadata that the storage system needs to process input/output (I/O) requests, and the non-essential metadata comprises additional metadata that can help the storage system increase I/O performance.

In some embodiments, the storage system maintains, for each SMU, a master partition table that is configured to store both the essential and the non-essential metadata, and a backup partition table that is configured to store only the essential metadata. The master partition table may have multiple entries (also referred to herein as master entries), and the backup partition table may have entries (also referred to herein as backup entries) in a one-to-one-correspondence with the master partition table entries. In some embodiments, the master and the backup partition tables can be stored on different physical nodes of the storage system, so that upon a failure in the node storing the master partition table, the storage system can reconfigure the backup partition table as the master partition table using embodiments described herein.

As described hereinbelow, upon processing a storage request for a given SMU, the storage system can identify any changes to the essential metadata, and store the identified changes to the backup partition table associated with the given SMU. Since the backup partition table only stores the essential metadata, the backup partition table typically uses less memory than the primary partition table, thereby enabling the storage system to store multiple copies of the backup partition table without significantly impacting performance.

By distributing the SMUs and the primary and the backup partition tables among different physical nodes of the storage system, embodiments of the present invention can help ensure the continuous availability of data stored in storage controller. Additionally, by segregating the essential metadata from the non-essential metadata, embodiments of the present invention can be used to design a storage system that can both minimize the size and reduce the update frequency of the essential metadata.

Figure 1:
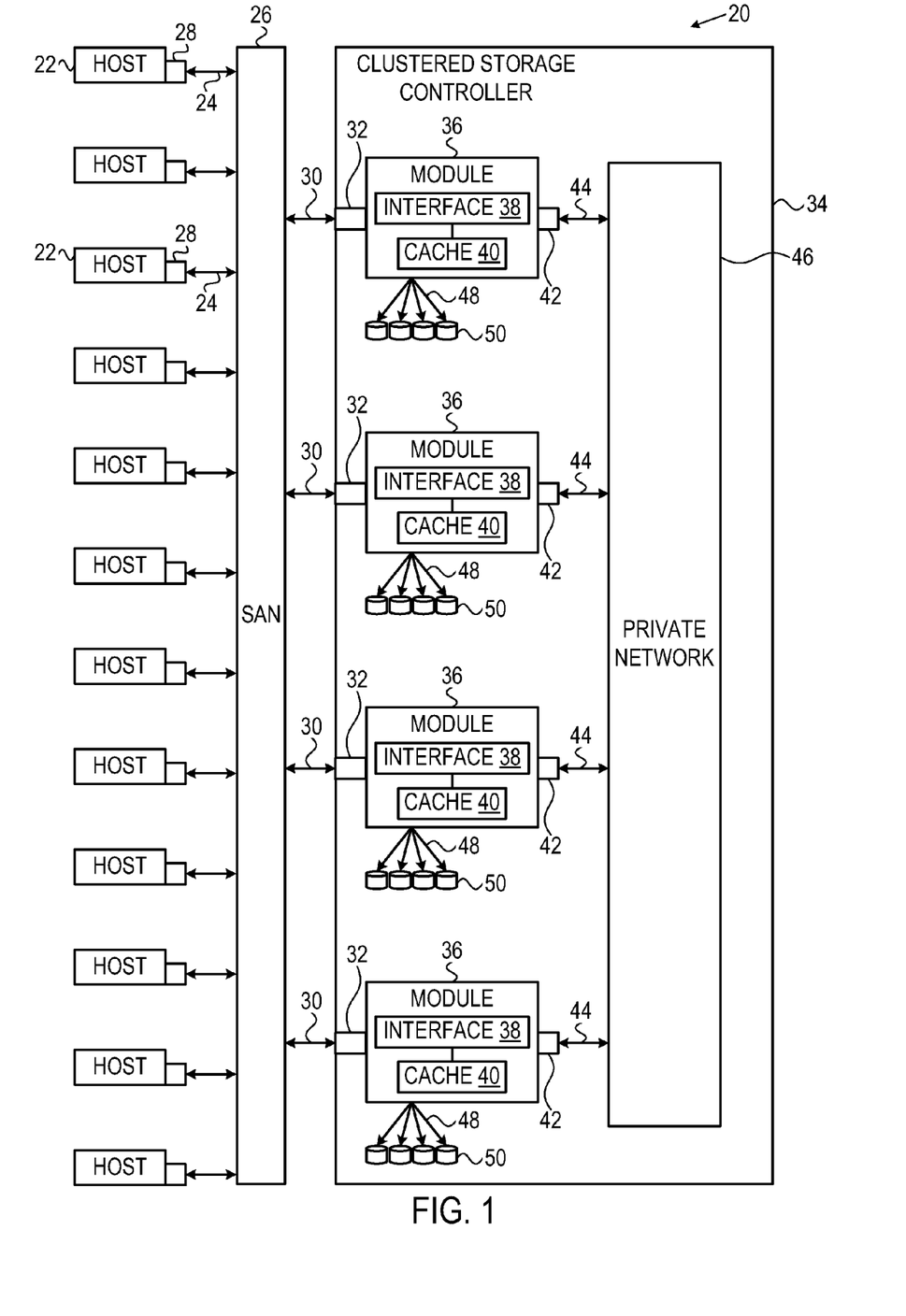
FIG. 1 is a block diagram that schematically illustrates a storage system, in accordance with an embodiment of the present invention.

FIG. 1 is a block diagram that schematically illustrates a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

While the configuration of storage subsystem 20 in FIG. 1 shows each module 36 comprising an adapter 32 that is configured to communicate with SAN 26, other configurations of the storage subsystem are considered to be within the spirit and scope of the present invention. For example, in an alternative configuration, adapter 32 is included in a subset of modules 36.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

While the configuration of storage subsystem 20 shown in Figure has the storage subsystem storing data to physical storage devices 50, other storage apparatuses are considered to be within the spirit and scope of the present invention. For example, storage subsystem 20 may store data to one or more data clouds or storage virtualization devices (SVD).

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
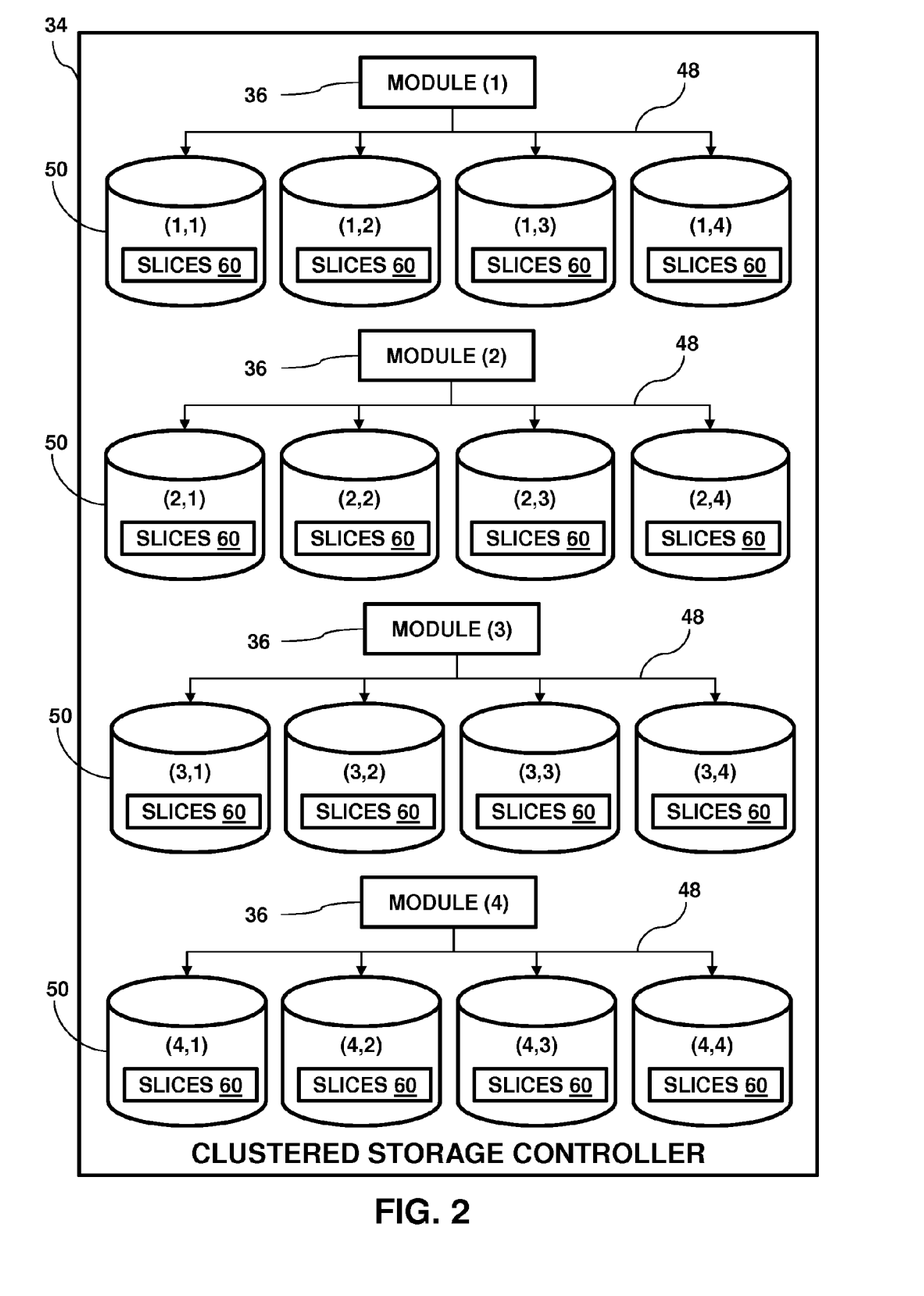
FIG. 2 is a block diagram that schematically illustrates an example of storage management units stored on a storage system, in accordance with an embodiment of the present invention.

FIG. 2 is a block diagram that schematically illustrates an example of storage management units (SMU) configured as slices 60 stored on storage devices 50 of clustered storage controller 34 (also referred to herein as a storage system), in accordance with an embodiment of the present invention. While the embodiments herein describe distributing metadata storage for slices 60, distributing metadata storage for other types of storage management units is considered to be within the spirit and scope of the present invention. For example, the embodiments described herein can be used to distribute metadata for other types of storage management units such as logical volumes and storage pools.

Additionally, in the embodiments described herein, each module 36 may be referenced by an identifier (A), where A is an integer representing a given module 36. As shown in FIG. 2, there are four modules 36 that may be referenced as module 36(1), module 36(2), module 36(3) and module 36(4).

Furthermore, each storage device 50 may be referenced by an ordered pair (A,B), where A is defined above, and where B is a number representing a given storage device 50 coupled to the given module via data connection 48. For example, storage devices 50(3,1), 50(3,2), 50(3,3) and 50(3,4) are coupled to module 36(3) via data connection 48.

Figure 3A:
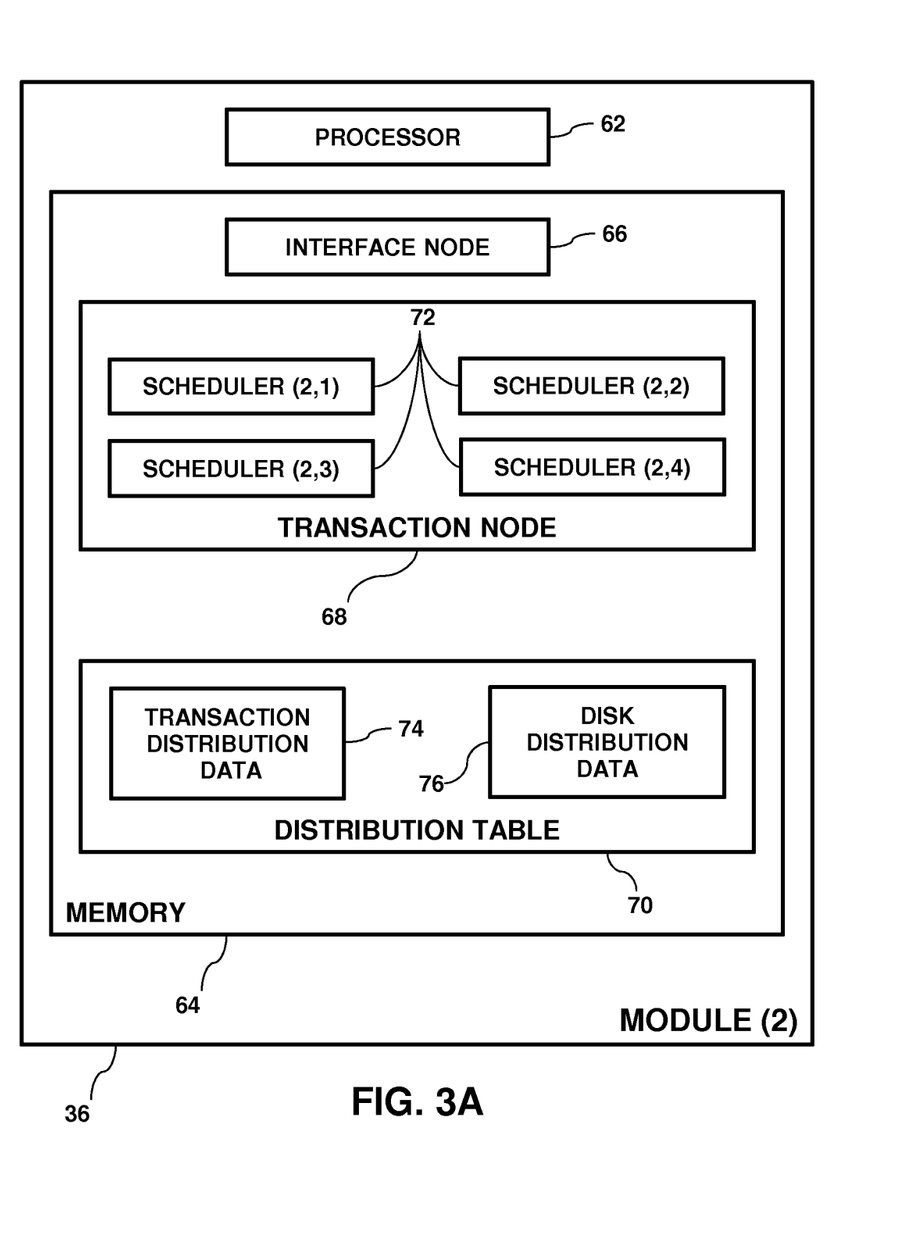
FIGS. 3A-3D, referred to collectively as FIG. 3, are block diagrams that schematically show functional elements of a module of the storage system, in accordance with an embodiment of the present invention.

FIG. 3A is a block diagram that schematically illustrates functional elements of module 36, in accordance with an embodiment of the present invention. Module 36 comprises a processor 62 and a memory 64. For a given module 36 configured to include adapter 32, memory 64 comprises an interface node 66 (i.e., not all memories 36 in storage system 20 include the interface node). Memory 36 also comprises a transaction node 68 and a distribution table 70. In operation, processor 62 executes interface node 66 and transaction node 68 from memory 64.

Processor 62 typically comprises a general-purpose computer, which is programmed in software to carry out the functions described herein. The software may be downloaded to processor 62 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

Interface node 66 comprises a software application that is configured to receive I/O requests from a given host computer 22, and to convey the I/O request to a given transaction node 68. Additionally, upon the given transaction node completing the I/O request, interface node 66 conveys a result of the I/O request to the given host computer. For example, if the I/O request comprises a write operation, then the conveyed result may comprise an acknowledgement of the write. Alternatively, if the I/O request comprises a read operation, then the conveyed result may comprise data retrieved from storage devices 50.

Transaction node 68 comprises a software application that processes I/O requests via multiple schedulers 72, which manage a set of slices 60. While the configuration of transaction node 68 shown in FIG. 3A comprises four schedulers 72, any number of schedulers is considered to be within the spirit and scope of the present invention. In some embodiments, processor 62 may execute each scheduler 72 on a separate thread (also known as a logical core) of the processor.

In embodiments described herein, each scheduler 72 may be referenced by an ordered pair (A,C), where A is defined above, and C is a number representing a given scheduler 72 executing within the given module. In the example shown in FIG. 3A, the first scheduler 72 in module 36(2) may be referred to herein as scheduler 72(2,1), the second scheduler 72 in module 36(2) may be referred to herein as scheduler 72(2,2), the third scheduler in module 36(2) may be referred to herein as scheduler 72(2,3), and the fourth scheduler 72 in module 36(2) may be referred to herein as scheduler 72(2,4).

As described supra, storage controller 34 may configure a logical volume as a set of slices 60, wherein each of the slices comprises a set of regions on a given storage device 50. For example, a given logical volume may comprise four slices 60 spread over storage devices 50(1,2), 50(2,3), 50(3,4) and 50(4,2). There may be instances where a given storage device stores more than one slice for a given logical volume. Additionally, as described in detail hereinbelow, processor 62 may store multiple copies of a given slice. For example, processor 62 may store a first copy of a given slice 60 on a first storage device 50 (also referred to herein as the primary storage device for the given slice), and an additional copy of the given slice on a second storage device 50 (also referred to herein as the secondary storage device for the given slice).

In embodiments of the present invention, each slice 60 can be associated with a first scheduler 72 that can be configured as a master scheduler, and one or more additional schedulers 72 that can be configured as backup schedulers. Differences between the master and the backup schedulers are described hereinbelow. In the event of a failure of the master scheduler, processor 62 can reconfigure one of the backup schedulers to function as the master scheduler, thereby ensuring the continuous availability of data stored in storage controller 34.

As described supra, processor 62 may store a first copy of a given slice 60 on a primary storage device 50, and an additional copy of the given slice on one or more secondary storage devices 50. In the event of a failure of the primary storage device, processor 62 can reconfigure one of the secondary storage devices to function as the primary storage device, thereby ensuring the continuous availability of data stored in storage controller 34.

Processor 62 can store associations between the slices, the schedulers and the storage devices to distribution table 70. Distribution table 70 comprises transaction distribution data 74 and disk distribution data 76. Transaction distribution data 74 can be configured to store associations between the slices and the schedulers, and disk distribution data 76 can be configured to store associations between the slices and the storage devices.

Figure 3B:
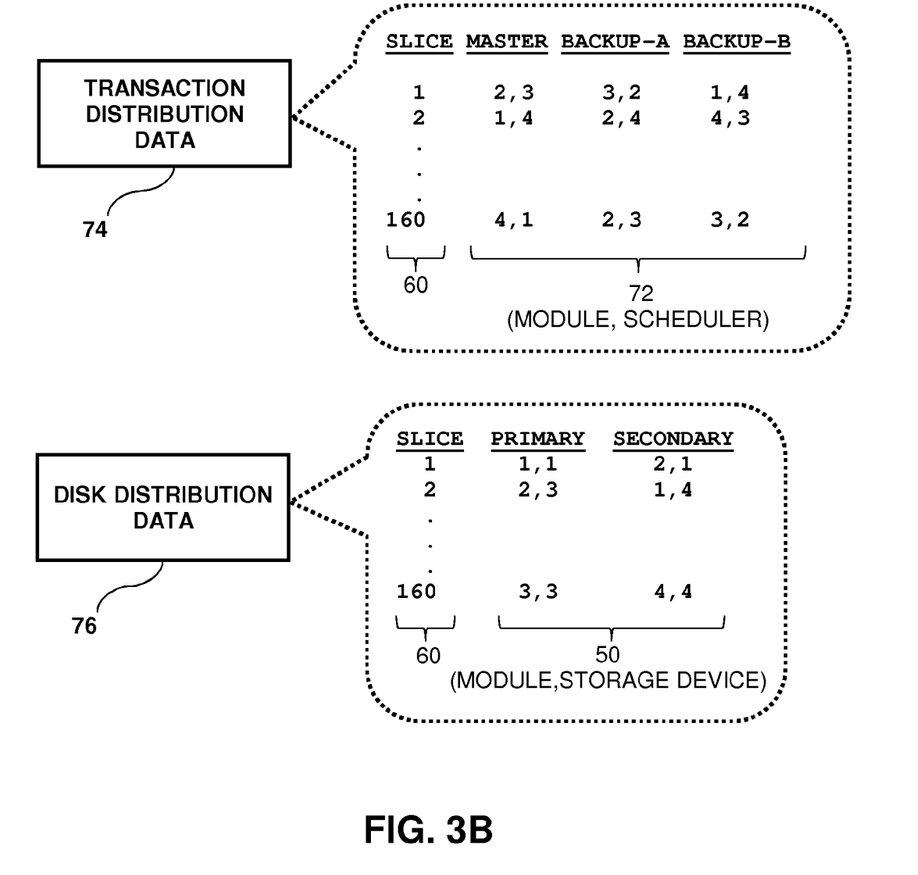

FIG. 3B is block diagram that schematically shows example entries in transaction distribution data 74 and disk distribution data 76, in accordance with an embodiment of the present invention. In the example shown in FIG. 3B, each slice 60 is associated with a master scheduler 72 and two backup schedulers 72, and a primary and a secondary storage device 50.

In the embodiments described herein, each slice may be referenced by an identifier (D), where D is a number representing a given slice 60. In the configuration shown in FIG. 3B-3D, storage controller 34 comprises 160 slices 60 that can be referenced as slice 60(1)-slice 60(160). Identifier D is also referred to herein as a slice number, so that each slice 60 has an associated slice number, and in the example D is an integer between 1 and 160.

As shown in transaction distribution data 74, scheduler 72(2,3) is configured as the master scheduler and schedulers 72(3,2) and 72(1,4) are configured as the backup schedulers (i.e., BACKUP-A and BACKUP-B as shown the figure) for slice 160(1). Additionally, as shown in disk distribution data 76 for slice 60(1), storage device 50(1,1) is configured as a primary storage device and storage device 50(2,1) is configured as a secondary storage device.

Figure 3C:
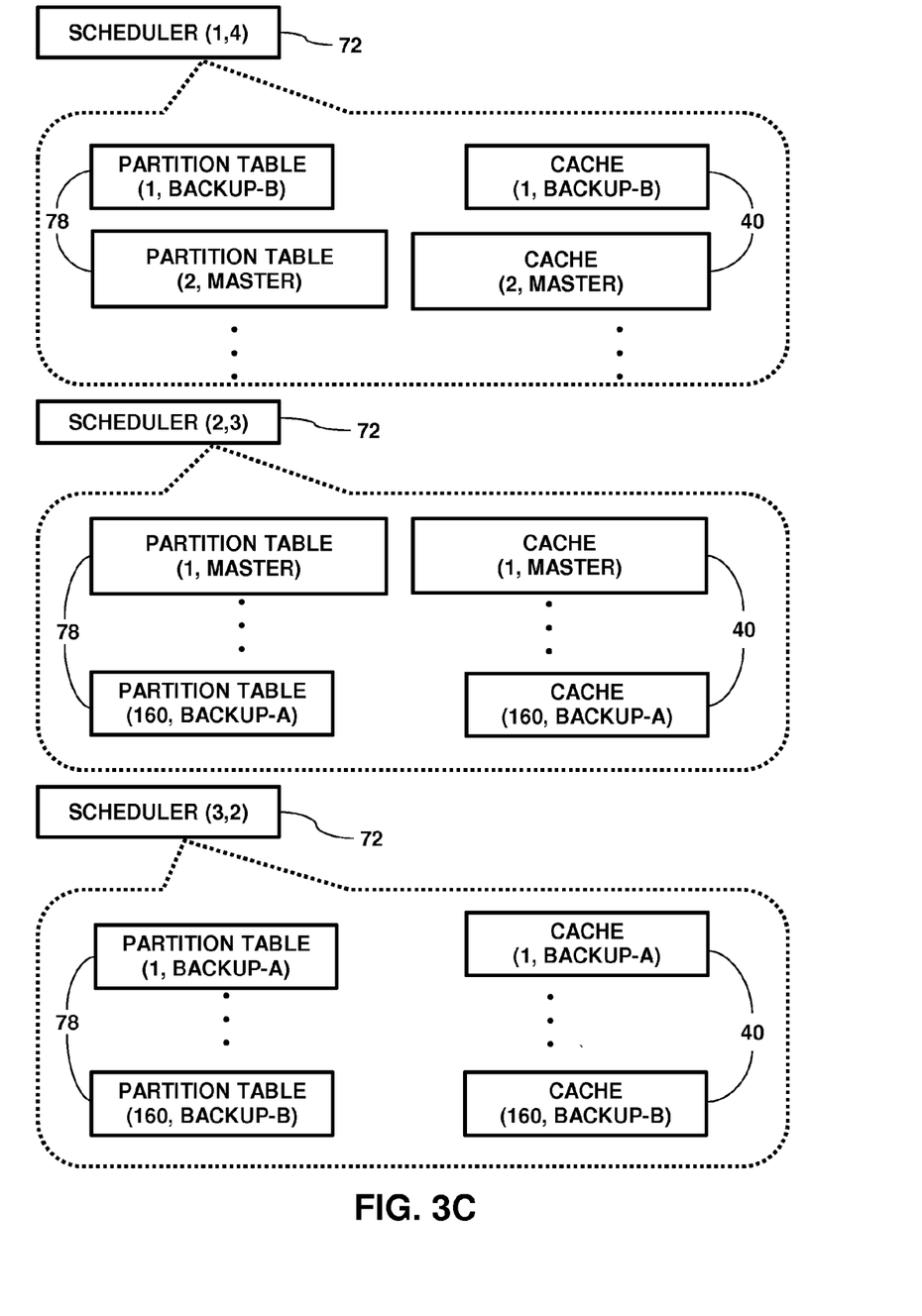

While the configuration of disk distribution data in FIG. 3C shows slices 60 stored Redundant Array of Inexpensive Disks (RAID) 10 configuration (i.e., each slice 60 is mirrored once among multiple storage devices 50), other storage configurations are considered to be within the spirit and scope of the present invention. For example, slices 60 may be stored in a RAID 6 (e.g., a RAID 6 6+2 or a RAID 6 8+2) configuration.

As shown in the Figures, for a given slice 160, the master scheduler, the backup scheduler(s), the primary storage device and the secondary storage device(s) can be distributed among different modules 36 of storage system 20. Additionally, each module 36 may store any number (including zero) of master and backup schedulers 72.

FIG. 3C is a block diagram that schematically illustrates schedulers 72(1,4), 72(2,3) and 72(3,2) in accordance with an embodiment of the present invention. Each scheduler 72 comprises pairs of partition tables 78 and caches 40, wherein each of the pairs is associated with a given slice 60. Each entry in a given partition table 78 corresponds to a partition (i.e., a region) on a given storage device 50, and comprises a data structure (e.g., an array) that enables processor 62 to map a given volume number and logical address to the partition. Operation of caches 40 is described in FIG. 1, hereinabove.

As described supra, each scheduler 72 can be associated with a given slice 60 and can function as either a master scheduler or a backup scheduler for the given slice. In the example shown in FIGS. 3B-3C, each slice 60 has a master scheduler 72 ("MASTER") and two backup schedulers 72 ("BACKUP-A" and "BACKUP-B"). Likewise, each partition table 78 may be referenced by an ordered pair (D,E), where D is a number representing a given slice 60, and E describes a role of a given partition table 78, and each cache 40 may be referenced by an ordered pair (D,F), where D is defined above, and F describes a role of a given cache 40. In embodiments described herein each slice 60 has a master cache 40 and two backup caches 40 (i.e., BACKUP-A and BACKUP-B).

Continuing the example described supra, the schedulers shown in FIG. 3C comprise the schedulers associated with slice 60(1). As shown in the Figure, scheduler 72(2,3) comprises partition table 78(1, MASTER) and cache 40(1, MASTER), scheduler 72(3,2) comprises partition table 78(1, BACKUP-A) and cache 40(1, BACKUP-A), and scheduler 72(1,4) comprises partition table 78(1, BACKUP-B) and cache 40(1, BACKUP-B).

In embodiments described herein, processor 62 can map an I/O request to a given scheduler 72, as opposed to mapping the I/O request to a given module 36 or a given storage device 50. By mapping I/O requests to schedulers 72, embodiments of the present convention "decouple" partition tables 78 from storage devices 50. In other words, upon receiving an I/O request, interface node 66 may convey the I/O request to a first module 36 executing a given scheduler 72 comprising a given partition table 78, wherein the given partition table references a given storage device 50 coupled to a second module 36.

Figure 3D:
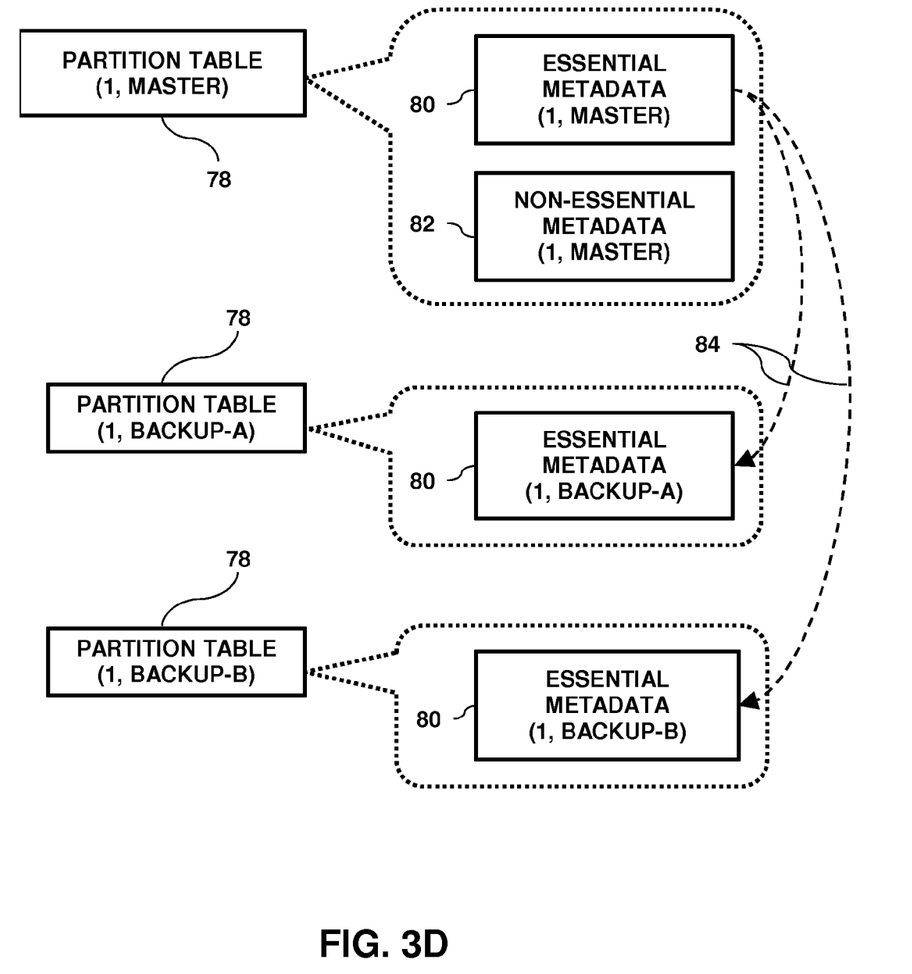

FIG. 3D is a block diagrams that schematically shows partition table 78, in accordance with an embodiment of the present invention. For a given partition table 78 configured as a master partition table (i.e., MASTER as shown in the Figure), the given partition table comprises essential metadata 80 and non-essential metadata 82. For a given partition table 78 configured as a backup partition table (i.e., BACKUP-A and BACKUP-B as shown in the Figure), the given partition table comprises essential metadata 80. In embodiments described herein, each essential metadata 80 may be referenced by an ordered pair (D,E), where D and E are defined above.

Essential metadata 80 comprises the minimum metadata necessary for processor 62 to be able to process I/O requests from host computer 22. Examples of essential metadata 80 for each partition in a given partition table 78 include, but are not limited to:

A volume number of a given slice 60 associated with the partition.

A starting logical address for the partition.

A location (i.e., an in-disk address, e.g., a track number) on a given storage device 50 for the partition.

Timestamps indicating the last time the partition was accessed and/or updated.

One or more flags.

Non-essential metadata 82 comprises metadata that processor 62 can access in order to process I/O requests more efficiently. Examples of non-essential metadata 82 for each partition in a given partition table 78 include, but are not limited to:

A hash table entry. Partition table 78 may include a hash table that enables processor 62 to rapidly translate a given volume number and logical address to an entry in the partition table.

Pointers to next and previous partitions in a given volume.

In embodiments of the present invention, while processing an I/O request for a given partition in a given slice, the master scheduler for the given slice updates the essential and the non-essential metadata associated with the master scheduler, and updates the essential metadata associated with the backup scheduler(s) for the given slice. Continuing the example described supra, if scheduler 72(2,3) is processing an I/O request for slice 60(1), then scheduler 72(2,3) updates essential metadata 80(1, PRIMARY), non-essential metadata 82(1, PRIMARY), essential metadata 80(1, BACKUP-A) and essential metadata 80(1, BACKUP-B), as indicated by arrows 84.

Storing only essential metadata 82 for a given slice can save space in memory 64 and enable storage controller 34 to maintain multiple backup schedulers 72 without significantly impacting performance, thereby ensuring the continuous availability of data stored in storage controller 34. In the event of a failure of a given master scheduler 72, one of the backup schedulers can be reconfigured (i.e., "promoted") to operate as the master scheduler (i.e., a new master scheduler 72) by calculating, using the essential metadata stored in the one of the backup scheduler's partition table 78, the non-essential metadata for the reconfigured scheduler, and storing the calculated non-essential metadata to the partition table of the newly "promoted" master scheduler 72.

As described supra, each scheduler comprises a cache 40.

Since the master scheduler processes both read and write requests, the cache for the master scheduler comprises a read cache and a write cache. Further space savings can be realized by having the backup scheduler(s) only store a write cache.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Updating Master and Secondary Partition Table Metadata

Figure 4:
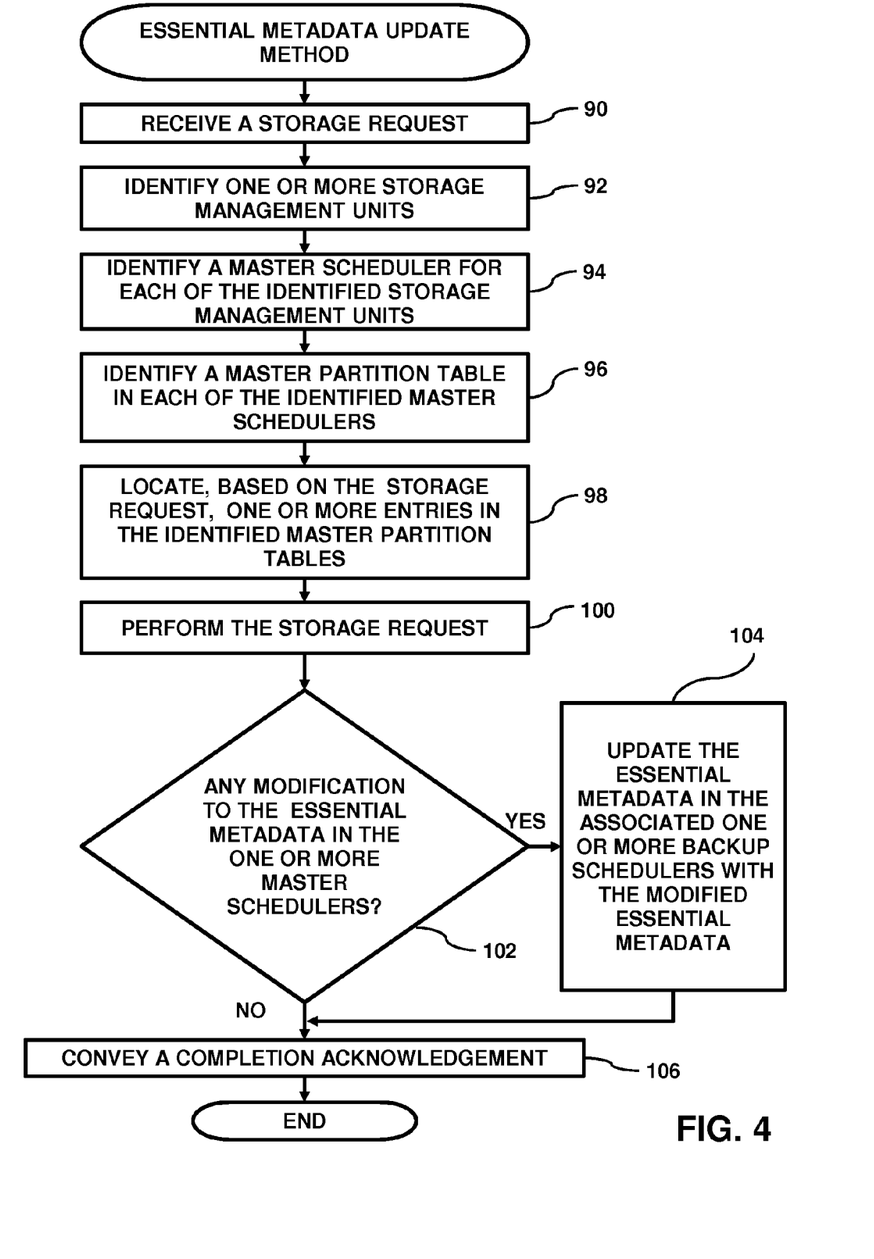
FIG. 4 is a flow diagram that schematically illustrates a method of updating essential metadata in a backup node of a given storage management unit, in accordance with an embodiment of the present invention.

FIG. 4 is a flow diagram that schematically illustrates a method of updating essential metadata 80 for a backup scheduler 72, in accordance with an embodiment of the present invention. In a receive step 90, interface node 66 receives a storage request. The storage request may comprise an I/O request from a given host computer 22 comprising a logical address and a volume number. Examples of I/O requests include requests to read data from a specific logical address of a logical volume, or requests to write data to a specific logical address of a logical volume. Other examples of storage requests include, but are not limited to mirroring requests, synchronization requests and snapshot requests.

In a first identification step 92, processor 62 identifies, based on the storage request, one or more storage management units. For example, if the storage request comprises and I/O request and the storage management units comprise slices 60, processor 62 can calculate a slice number for the received volume number and logical address. In the example shown in FIG. 3, the storage devices comprise 160 slices 60. Therefore to calculate a slice number for a given logical address, processor 62 can use a calculation such as a modulo operation using a divisor of 160. For example, if the received logical address is 12,768, then a slice number of 128 is calculated as follows:

$$12{,}768 \bmod 160 = 128$$

In a second identification step 94, processor 62 identifies a master scheduler 72 for each of the identified storage management units. In the example shown in FIG. 3, processor 62 retrieves, from transaction distribution data 74, the ordered pair (A,C) referencing the master scheduler and the backup scheduler(s) associated with the calculated slice number. Additionally, processor 62 retrieves, from disk distribution data 76, the primary and the secondary storage devices associated with the calculated slice number. In a third identification step 96, processor 62 identifies the master partition table associated with each of the identified (i.e., one or more) master schedulers.

In a locate step 98, processor 62 locates, based on the storage request, at least one entry in the each of the identified master partition tables. In the example shown in FIG. 3, processor 62 may calculate a hash function, based on the received volume number and logical address, and use the calculated result of the hash function as an index into a hash table stored in the primary partition table. Upon locating the entry, processor 62 retrieves, from the partition table, a location on the primary and the secondary storage devices that corresponds to the received volume and logical address. In some embodiments, the location comprises a track number and an offset.

In a perform step 100, the master scheduler for the calculated slice number performs the requested storage operation. While processing the storage operation the master scheduler identifies any essential and/or non-essential metadata that was modified as a result of the storage operation, and updates the essential and the non-essential metadata in the located one or more entries in the identified one or more master partition tables.

In a first comparison step 102, if processor 62 identifies any modification (i.e., changes) to the essential metadata in the identified on or more master schedulers, then in an update step 104, the master scheduler updates the essential metadata in the one or more backup schedulers for each of the identified master schedulers with the modified essential metadata.

In the example shown in FIG. 3, the master and each of the backup partition tables have a one-to-one correspondence of entries, so that the corresponding entries reference the same volume numbers and logical addresses. Therefore, when updating the essential metadata in the backup scheduler, the master scheduler copies the updated essential metadata from the at least one of the master entries to their corresponding backup entries (i.e., the backup entries in the one or more backup partition tables corresponding to the entries located in step 98).

In a completion step 106, interface node 66 conveys an storage request completion acknowledgement (e.g., the host computer that issued a I/O request) and the method ends. Returning to step 102, if there was no modification to the essential metadata in the identified one or more master schedulers, the method continues with step 106.

When processing storage requests that only update non-essential metadata 82, processor 62, in step 102, detects changes to the non-essential metadata in the one or more master partition tables, and does not detect any changes to the non-essential metadata in the one or more master partition tables. Additionally or alternatively, in step 102, processor 62 may not detect any changes to essential metadata 80 or non-essential metadata 82 in the one or more master partition tables.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, by a storage system, a storage request;
identifying, based on the storage request, one or more storage management units;
identifying, for each of the storage management units, one or more master partition tables having multiple master entries and one or more backup partition tables, each of the backup partition tables having backup entries in a one-to-one-correspondence with the master entries;
performing the storage request;
upon performing the storage request, identifying any changes to essential metadata in the one or more master partition tables;
storing the identified changes to the essential metadata in the one or more backup partition tables; and
upon detecting a failure in master partition table, configuring one of the backup partition tables as a replacement master partition table, calculating, using the essential metadata in the replacement master partition table, non-essential metadata, and storing the calculated non-essential metadata to the replacement master partition table.

2. The method according to claim 1, wherein the storage management unit is selected from a list comprising a storage pool, a logical volume and a slice.

3. The method according to claim 1, wherein the storage request is selected from a list comprising an input/output request, a mirroring request, a synchronization request and a snapshot request.

4. The method according to claim 1, and comprising identifying, based on the storage request, at least one of the master entries in each of the one or more master partition tables.

5. The method according to claim 4, wherein performing the storage request comprises updating the essential metadata and non-essential metadata in the at least one of the master entries.

6. The method according to claim 5, wherein storing the changes to the essential metadata comprises copying the updated essential metadata from the at least one of the master entries to the corresponding backup entries.

7. The method according to claim 6 and comprising conveying a storage request acknowledgement upon storing the identified changes to the essential metadata.

8. The method according to claim 1, and comprising upon performing the storage request, identifying, in the one or more master partition tables, changes to the non-essential metadata, and identifying in the at least one master partition tables, no changes to the essential metadata.

9. The method according to claim 1, and comprising identifying, upon performing the storage request, no changes to the non-essential and the essential metadata in the one or more master partition tables.

10. A storage system, comprising:
a memory configured to store one or more master partition tables and one or more backup partition tables; and
a processor configured to receive a storage request, to identify, based on the storage request, one or more storage management units, to identify, for each of the storage management units, one of the master partition tables having multiple master entries and the one or more backup partition tables, each of the backup partition tables having backup entries in a one-to-one-correspondence with the master entries, to perform the storage request, to identify, upon performing the storage request, any changes to essential metadata in the one or more master partition tables, and to store the identified changes to the essential metadata in the one or more backup partition tables; wherein upon detecting a failure in master partition table, the processor is configured to configure one of the backup partition tables as a replacement master partition table by calculating, using the essential metadata in the replacement master partition table, non-essential metadata, and storing the calculated non-essential metadata to the replacement master partition table.

11. The storage system according to claim 10, wherein the processor is configured to identify, based on the storage request, at least one of the master entries in each of the one or more master partition tables.

12. The storage system according to claim 11, wherein the processor is configured to perform the storage request by updating the essential metadata and non-essential metadata in the at least one of the master entries.

13. The storage system according to claim 12, wherein the processor is configured to store the changes to the essential metadata by copying the updated essential metadata from the at least one of the master entries to the corresponding backup entries.

14. The storage system according to claim 13, wherein the processor is configured to convey a storage request acknowledgement upon storing the identified changes to the essential metadata.

15. The storage system according to claim 12, wherein upon performing the storage request the processor is configured to identify, in the one or more master partition tables, changes to the non-essential metadata, and identifying in the one or more master partition tables, no changes to the essential metadata.

16. The storage system according to claim 10, wherein upon performing the storage request, the processor is configured to identify no changes to the non-essential and the essential metadata in the one or more master partition tables.

17. A computer program product, the computer program product comprising:
a non-transitory computer readable storage medium having computer readable program code embodied therewith, the computer readable program code comprising:
computer readable program code configured to identify, based on the storage request, one or more storage management units;
computer readable program code configured to identify, for each of the storage management units, one or more master partition tables having multiple master entries and one or more backup partition tables, each of the backup partition tables having backup entries in a one-to-one-correspondence with the master entries;
computer readable program code configured to perform the storage request;
computer readable program code configured upon performing the storage request, to identify any changes to essential metadata in the one or more master partition tables;
computer readable program code configured to store the identified changes to the essential metadata in the one or more backup partition tables; and
computer readable program code configured to configure, upon detecting a failure in master partition table, one of the backup partition tables as a replacement master partition table, to calculate, using the essential metadata in the replacement master partition table, non-essential metadata, and to store the calculated non-essential metadata to the replacement master partition table.

* * * * *